United States Patent
Wigren et al.

(10) Patent No.: US 7,692,582 B2
(45) Date of Patent: Apr. 6, 2010

(54) METHOD AND ARRANGEMENTS RELATING TO SATELLITE-BASED POSITIONING

(75) Inventors: Karl Torbjorn Wigren, Uppsala (SE); Mans Persson, Skogas (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 325 days.

(21) Appl. No.: 11/912,991

(22) PCT Filed: Apr. 29, 2005

(86) PCT No.: PCT/SE2005/000635

§ 371 (c)(1),
(2), (4) Date: Oct. 29, 2007

(87) PCT Pub. No.: WO2006/118494

PCT Pub. Date: Nov. 9, 2006

(65) Prior Publication Data

US 2008/0191933 A1    Aug. 14, 2008

(51) Int. Cl.
*G01S 1/01* (2006.01)
(52) U.S. Cl. .............................. 342/357.15; 342/357.12
(58) Field of Classification Search ............ 342/357.15, 342/357.01, 357.12
See application file for complete search history.

(56) References Cited

U.S. PATENT DOCUMENTS 7,299,071 B1 * 11/2007 Barratt et al. ............ 455/562.1

FOREIGN PATENT DOCUMENTS

EP         1260829 A1    11/2002
WO    WO 00/69187 A1    11/2002

OTHER PUBLICATIONS

A. Kangas and T. Wigren, "Location coverage and sensitivity with A-GPS", URSI EMP-S, Pisa, Italy, May 2004.

* cited by examiner

*Primary Examiner*—Thomas H Tarcza
*Assistant Examiner*—Harry Liu

(57) ABSTRACT

A method, an apparatus and a computer program for providing assistance data for satellite based positioning of mobile stations operating in a first cell of a cellular radio communication system utilizing ranging signals transmitted by satellites. A sequence of assistance data for positioning of a mobile station operating in the first cell is generated (306) by including in said sequence assistance data associated with individual satellites in a set of at least four satellites. At least one of said set of satellites and the order in which assistance data associated with individual satellites occurs in said sequence of assistance data is selected (305) utilizing control data associated with the first cell and reflecting local obstructions in the first cell or its immediate surroundings affecting reception of said ranging signals in the first cell. The invention also includes a method, an apparatus and a computer program for updating (311) said control data utilizing information derived from positionings of mobile stations in the first cell.

23 Claims, 7 Drawing Sheets

METHOD AND ARRANGEMENTS RELATING TO SATELLITE-BASED POSITIONING

TECHNICAL FIELD OF THE INVENTION

The present invention relates in general to positioning of mobile equipment by use of satellites.

DESCRIPTION OF RELATED ART

In recent years, determination of the geographic position of an object, equipment or a person carrying the equipment has become more and more interesting in many fields of application. One approach to solve the positioning is to use ranging signals emitted from satellites to determine a position. Well-known examples of such systems are the Global Positioning System (GPS) (see e.g. [1]) and the coming GALILEO system. The position is given with respect to a specified coordinate system as a triangulation/trilateration based on a plurality of received satellite signals.

A stand-alone GPS receiver can obtain full locking to GPS satellite signals, without having any other information about the system except nominal carrier frequency and the rules by which data carried by the signals are modulated. Basically, the three-dimensional position as well as a receiver clock bias to the satellite time have to be determined in the position calculation step.

Assisted GPS (AGPS) has been defined as an enhancement of GPS (see e.g. 3rd Generation Partnership Project (3GPP) specifications TS 25.331 or TS 44.031) for integration of GPS receivers into user equipment, i.e. mobile stations, of cellular communication systems. Assisted GPS in general aims at improving the performance of GPS receivers in many different respects, including detection sensitivity, time to obtain a location estimate, accuracy and saving battery power. This is done by moving some functionality from the GPS receiver in the mobile station to the network and hence only performing a subset of the GPS tasks in the GPS receiver itself. More in particular, GPS reference receivers are provided on the network side of the cellular communication system. These reference GPS receivers receive ranging signal transmission from GPS satellites (Space Vehicles) and collect assistance data associated with the respective GPS satellite that, when transmitted to mobile stations, enhance the performance of the GPS receivers integrated in the mobile stations.

There are two types of AGPS, Mobile Station (or User Equipment) based and Mobile Station (or User Equipment) assisted. In Mobile Station based AGPS, the location of a mobile station is calculated in the mobile station using ranging signal measurement results determined by the mobile station together with assistance data provided by the network. In Mobile Station assisted AGPS (sometimes also referred to as Network based AGPS), the mobile station only measures and reports timing of received ranging signals reflecting the pseudoranges to the Space Vehicles (i.e. satellites).

AGPS solutions (both Mobile Station based and Mobile Station assisted) can further be divided into "control plane solutions to AGPS" and "user plane solutions to AGPS" depending on how a location server is connected to a cellular network. In "control plane solutions to AGPS" the location server functionality (which may be implemented in a separate location server node, sometimes referred to as a Serving Mobile Location Center (SMLC) or Standalone SMLC (SAS), or integrated together with other functionality in other network nodes such as radio network controllers) is tightly integrated with the cellular network and assistance data and measurement results are communicated using so called control plane signaling. In "user plane solutions to AGPS", the location server functionality is less closely integrated with the cellular network and assistance data and measurement results are communicated using so called user plane signaling, i.e. ordinary user data packets are used to convey this information transparently to the cellular network.

"Location Coverage and sensitivity with A-GPS" by A. Kangas and T. Wigren presented at URSI EMP-S, Pisa. Italy May 2004 discusses how assistance data improves the sensitivity and time to a first fix of AGPS receivers as compared to conventional GPS receivers. The article discusses different usage scenarios and demonstrates that consistent indoor performance far from windows are likely to require highly accurate time assistance, while urban canyon operation and more easy indoor performance may do without such microsecond accuracy.

When positioning a mobile station using AGPS, assistance data associated with a selected set of Space Vehicles are provided to the mobile station. The selection of Space Vehicles and the order of occurrence of assistance data associated with the selected Space Vehicles are performed by a positioning node according to a cell independent and fixed scheme. According to one prior art scheme, a first Space Vehicle having a highest elevation is selected and further Space Vehicles may then be selected as high as possible while maintaining a sufficient spread in azimuth in order to obtain a favourable measurement geometry. According to another prior art scheme Space Vehicles are selected based on how close to 45 degree elevation they are (which automatically achieves a spread in azimuth improving the measurement geometry).

Published international application WO 00/69187 discloses a system and method in which GPS Assistance data is transmitted from a wireless telecommunications network to individual GPS-capable mobile stations using a point-to-point signaling protocol.

SUMMARY OF THE INVENTION

The problem dealt with by the present invention is improving performance in the context of satellite based positioning with assistance data. In particular the invention improves the probability of successful positioning of mobile stations and/or reduces the time required for positioning of mobile stations.

An advantage afforded by the invention is that it offers improved performance in the context of satellite based positioning with assistance data.

The invention will now be described in more detail with reference to exemplary embodiments thereof and also with reference to the accompanying drawings.

DETAILED DESCRIPTION OF THE EMBODIMENTS

Figure 1:
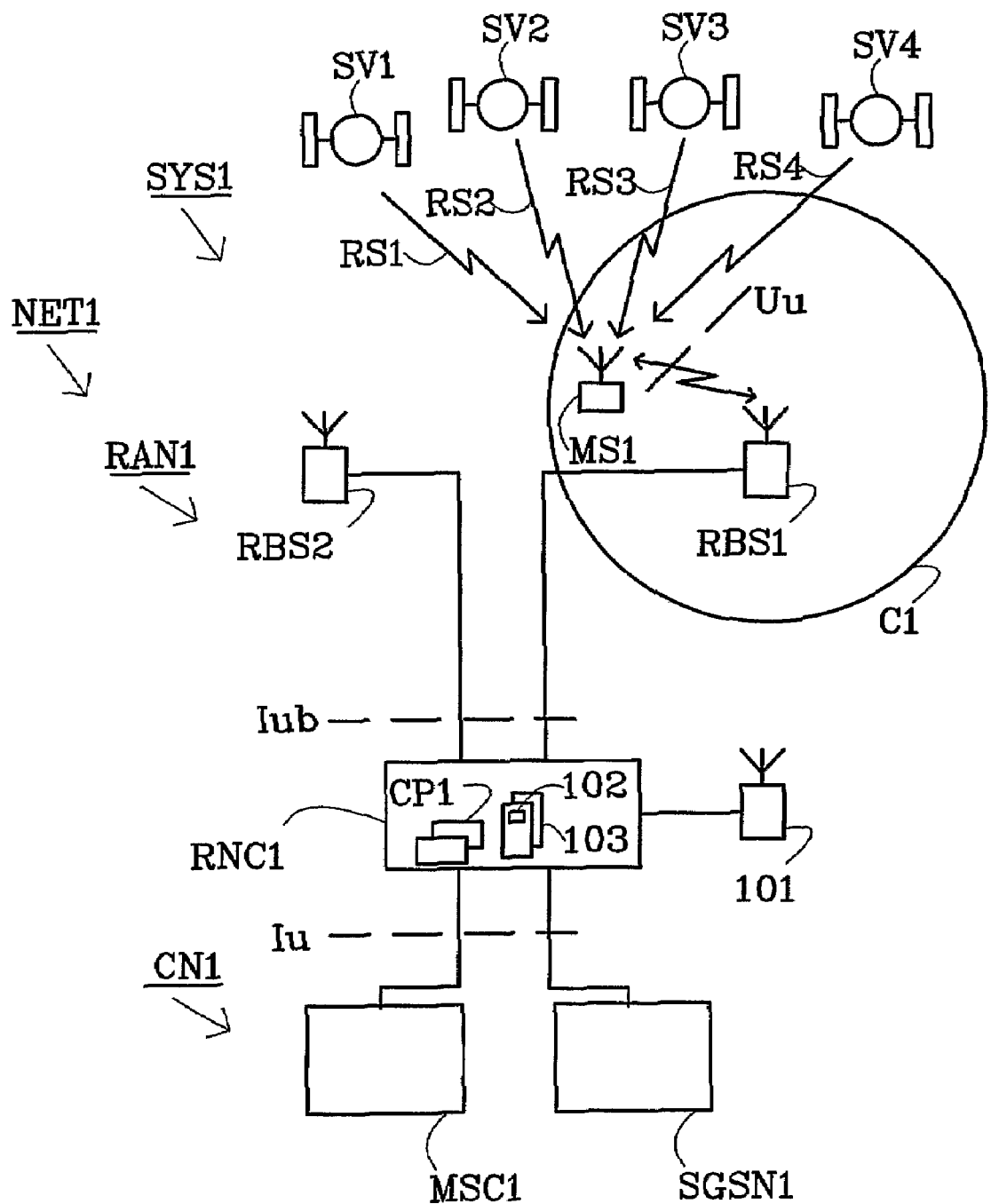
FIG. 1 is a schematic view of an example scenario of Mobile Station assisted AGPS in which the present invention is applied

FIG. 1 illustrates a non-limiting example scenario in which the present invention may be applied. In this example scenario a basic wireless communication system SYS1 together with the Global Positioning System (GPS) is used to provide Mobile Station assisted AGPS. The exemplary wireless communication system SYS1 illustrated in FIG. 1 is a Universal Mobile Telecommunication System (UMTS). The communication system SYS1 includes a network part NET1 and User Equipment (UE), alternatively referred to as mobile stations (MS). The network part NET1 comprises a core network CN1 and a UMTS Terrestrial Radio Access Network (UTRAN) RAN1. The core network CN1 includes a Mobile services Switching Center (MSC) node MSC1 that provides circuit-switched services and a General Packet Radio Service (GPRS) node SGSN1, sometimes referred to as a Serving GPRS: Support node (SGSN), which is tailored to provide packet-switched type services.

Each of the core network nodes MSC1 and SGSN1 connects to the the radio access network RAN1 over a radio access network interface referred to as the Iu interface. The radio access network RAN1 includes one or more radio network controllers (RNCs). For sake of simplicity, the radio access network RAN1 of FIG. 1 is shown with only one radio network controller node RNC1. Each radio network controller is connected to and controls a plurality of radio base stations (RBSs). For example, and again for sake of simplicity, FIG. 1 only illustrates a first radio base station node RBS1 and a second radio base station node RBS2 connected to the radio network controller node RNC1. The interface between the radio network controller RNC1 and the base stations RBS1 and RBS2 is referred to as the Iub interface. Mobile stations, such as mobile station MS1 shown in FIG. 1, communicate with one or more radio base stations RBS1-RBS2 over a radio or air interface referred to as the Uu interface. Each of the radio interface Uu, the Iu interface and the Iub interface are shown by dashed lines in FIG. 1.

In FIG. 1, the GPS system is represented by Space Vehicles, i.e. satellites, SV1-SV4. Each Space Vehicle SV1-SV4 transmits a corresponding ranging signal RS1-RS4. Please note that for sake of simplicity, only four Space Vehicles SV1-SV4 are illustrated in FIG. 1.

In the example scenario of FIG. 1, the position of mobile stations such as mobile station MS1 is determined using mobile station assisted AGPS. This example scenario also illustrates a control plane solution to AGPS where the location server functionality is integrated in radio network controller nodes such as the radio network controller node RNC1. In this example scenario, each radio network controller is connected to a GPS reference receiver 101. As a person skilled in the art recognizes, there are several alternatives for how GPS reference receivers could be deployed in other scenarios, e.g. having only a few in a cellular network or having no GPS reference receivers in a cellular network and instead receiving the corresponding information from an external source outside the cellular network. The reference GPS receiver 101 continuously tracks the detectable Space Vehicles SV1-SV4. The reference GPS receiver 101 would normally be mounted in a high position, where obstructions between the reference GPS receiver antenna and the sky are minimal. This makes it possible for the reference GPS receiver 101 to track most Space Vehicles that are above the horizon, as seen by the reference GPS receiver 101, at a given point in time.

Each ranging signal RS1-RS4 transmitted by a Space Vehicle SV1-SV4 is modulated with a 50 bits per second navigation message. This navigation message extends over many seconds. The GPS reference receiver 101 is capable of demodulation of the navigation messages transmitted on the different ranging signals RS1-RS4. The contents of the navigation messages are then refined in the radio network controller node RNC1, after which the information can be transmitted as GPS assistance data to mobile stations. This implies that the GPS receivers integrated in mobile stations do not need to demodulate the navigation messages. This results in reduced positioning time and increased GPS receiver sensitivity (see [2]).

The navigation data demodulated by the reference GPS receiver on each received ranging signal RS1-RS4 typically contains GPS Almanac (a long time rough Space Vehicle position prediction model), Space Vehicle Health, ephemeris (a short time accurate Space Vehicle position prediction model, used in the position calculation), GPS Time of Week (TOW) as well as the ionospheric model (used for position error reduction). This navigation data allows for the computation of elevation and azimuth angles of Space Vehicles, as seen from any point on Earth.

The GPS receivers integrated in mobile stations, such as mobile station MS1 in FIG. 1, can have vastly different structures and performance. Normally, the steps of code/Doppler acquisition and GPS navigation bit synchronization followed by GPS TOW synchronization are included though (see [2] for details). For reasons of hardware complexity some GPS receivers tend to lock-on to one or maybe a few Space Vehicles at a time. When determining which Space Vehicle to try and detect first, one strategy is to start with the Space Vehicle for which assistance data is received first from the radio network controller RNC1 (the first Space Vehicle represented in the assistance data list). This is beneficial since the messages conveying assistance data from the network NET1 to the mobile stations are large and require a substantial amount of time for transfer from the radio network controller RNC1 to a mobile station. Typically, transfer of assistance data for twelve Space Vehicles may require three seconds in practice, hence positioning time may in some situations be reduced by 25-30% (Some GPS receivers are able to produce a position fix within five seconds) by starting the GPS Space Vehicle acquisition process as soon as assistance data for the first Space Vehicle in the assistance data list has been received.

The key factor for a successful acquisition of a Space Vehicle in a mobile station is the received signal strength (as received by the GPS receiver of the mobile station) of the ranging signal transmitted by the Space Vehicle in question (see [2]). The signal strength of ranging signals RS1-RS4 as seen by a mobile station varies with the terrain in which the mobile station is located. In e.g. urban canyons, Space Vehicles at high elevation angles and at azimuth angles coinciding with the major street directions, are likely to provide high signal strengths. In open areas the distribution of signal strength can be expected to be almost uniform, with somewhat lower values for Space Vehicles with low elevation angles. The latter situation is altered in mountainous areas, where high elevation obstructions may be in place in some directions, thereby favouring Space Vehicles with high elevation angles. Still a different situation exist indoors, where low elevation Space Vehicles can be expected to radiate further indoor through windows than high elevation Space Vehicles.

To summarize, the "best" Space Vehicles for a mobile station varies strongly with the position and general environment of the mobile station. In order to minimize the positioning time it is beneficial if the mobile station starts the acquisition with the Space Vehicles that are most likely to be received with a high signal strength by the GPS receiver integrated in the mobile station. Some GPS receivers may actually fail to produce a position fix, at least within a short enough period of time, in case they attempt acquisition of Space Vehicles with a signal strength that is too low for acquisition.

The present invention addresses the problem of improving performance in the context of satellite based positioning with assistance data. In particular, the invention improves the probability of successful positioning of mobile stations and/or reduces the time required for positioning of mobile stations.

The invention provides methods of providing assistance data for satellite based positioning of mobile stations operating in a cellular radio communication system as well as methods for updating control data related to such satellite based positioning. The invention also provides apparatuses and computer programs for performing said methods.

A basic method according to the invention of providing assistance data for positioning of mobile stations operating in a first cell of a cellular radio communication system includes generating a sequence of assistance data for positioning of a mobile station operating in the first cell by including in said sequence, assistance data associated with individual satellites in a set of at least four satellites. At least one of said set of satellites and the order in which assistance data associated with individual satellites occurs in said sequence of assistance data is selected utilizing control data associated with the first cell and reflecting local obstructions in the first cell or its immediate surroundings affecting reception of said ranging signals in the first cell.

By utilizing control data, associated with and reflecting local obstructions (i.e. terrain issues) affecting reception of ranging signals in the first cell in which the mobile station is operating, the selection of the set of satellites for which to provide associated assistance data and/or the selection of the order in which assistance data associated with individual satellites occurs in the generated sequence of assistance data can be made so as to improve the probability of successful positioning and/or reduce the average time required for positioning of mobile stations in the first cell.

The control data associated with the first cell may include one or more configuration parameters and/or control data generated by applying a method of updating control data in accordance with the invention.

A basic method according to the invention of updating control data includes automatically updating control data associated with a first cell of a cellular radio communication system and reflecting local obstructions in the first cell or its immediate surroundings affecting reception in the first cell of said ranging signals, wherein said updating is performed utilizing information derived from positionings of mobile stations in the first cell.

Figure 3A:
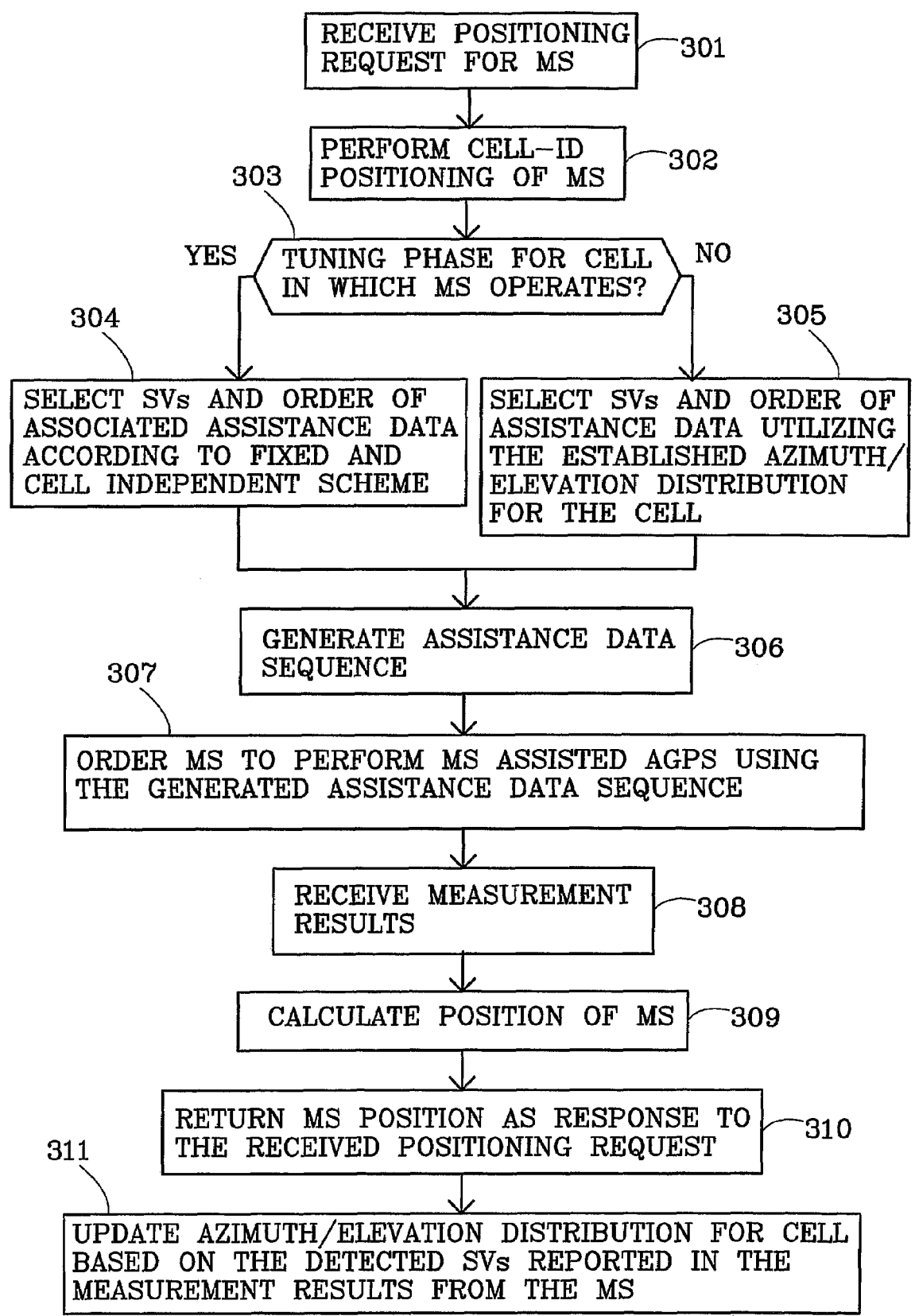
FIG. 3A-B are flowcharts illustrating a first exemplary embodiments of methods according to the invention.
Figure 3B:
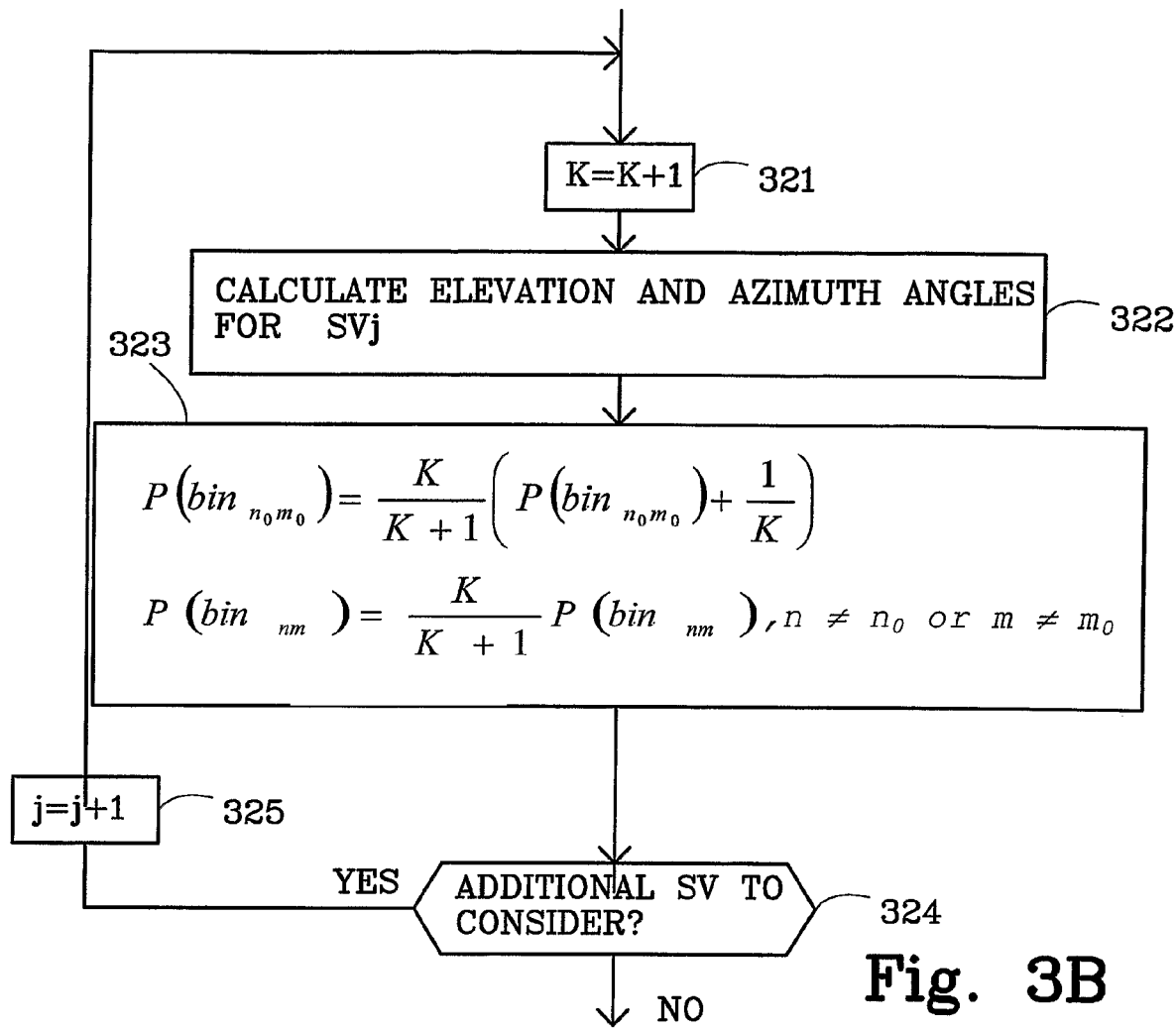

FIG. 3A-3B are flow charts illustrating a first exemplary embodiment of a method according to the invention of providing assistance data and also a first exemplary embodiment of a method according to the invention of updating control data. Both said exemplary methods may be implemented in the radio network controller RNC1 of FIG. 1.

In these first exemplary embodiments, for each cell there is control data in the form of an Azimuth/Elevation distribution associated with the cell. The Azimuth/Elevation distribution models the probability of successful Space Vehicle detection as a function of azimuth and elevation. The azimuth angle ($\beta$) interval [0, 360] degrees and the elevation angle ($\alpha$) interval [0,90] is divided in NM bins for the cell, $$\text{bin}_{nm=\{\beta,\alpha|\beta \in 360[(n-1)/N, n/N[, \alpha \in 90[(m-1)/M, m/M[\}} \quad (1)$$

At step 301 of FIG. 3A, a positioning request for positioning of the mobile station MS1 is received in a 3GPP TS 25.413 LOCATION REPORTING CONTROL message from the core network CN1.

At step 302, CELL-ID positioning is performed to determine in which cell (e.g. cell C1 schematically illustrated in FIG. 1) the mobile station MS1 is operating. In a soft handover situation, i.e. where a mobile station would be associated with an Active Set comprising more than one cell, there are several alternative solutions for deciding in which cell the mobile station is considered to be operating. These alternatives include e.g. selecting any one of the cells in the Active set or selecting the best cell based on e.g. measurements of pathloss.

At step 303, a check is made whether positioning in the cell in which the mobile station MS1 is located is operating in a tuning phase.

If positioning in the cell is operating in a tuning phase (an alternative YES at step 303), a set of Space Vehicles (i.e. satellites) for which associated assistance data should be provided to the mobile station MS1 is selected at step 304. Furthermore, also the order in which said associated assistance data should be provided to the mobile station MS1 is also selected at step 304. Both the selection of Space Vehicles and the order in which the assistance data associated with the selected Space Vehicles are provided to the mobile station MS1 are selected according to a fixed and cell independent scheme. More in particular, in this exemplary embodiment the Space Vehicles are selected randomly among the satellites which according to their GPS Almanac data are believed to be above the horizon (elevation greater than zero degrees) as viewed by the GPS reference receiver 101.

If positioning in the cell is not operating in a tuning phase (an alternative NO at step 303), a set of Space Vehicles for which associated assistance data should be provided to the mobile station MS1 is selected at step 305. Furthermore, also the order in which said associated assistance data should be provided to the mobile station MS1 is selected at step 305. Both the selection of Space Vehicles and the order in which the assistance data associated with the selected Space Vehicles are provided to the mobile station MS1 are selected utilizing an established Azimuth/Elevation distribution associated with the cell in which the mobile station MS1 is currently operating. More in particular the Space Vehicles are selected as follows. First the Space Vehicle which according to the established Azimuth/Elevation distribution has the highest probability of being successfully detected is selected, then the Space Vehicle having the second highest probability of being successfully detected is selected etc. The order in which assistance data associated with individual Space Vehicles are provided to the mobile station MS1 is the same order as the Space Vehicles were selected, i.e. starting with the assistance data associated with the Space Vehicle having the highest probability of being successfully detected. This makes sure that the Space Vehicles which probably are easiest to detect for mobile stations operating in the cell arrive to the mobile station MS1 first. In case the mobile station MS1 proceeds with positioning before all assistance data is received, this should also reduce positioning time. Note that this particular solution amounts to using a maximum likelihood criterion in the selection of Space Vehicles.

At step 306 a sequence of assistance data is generated by including the assistance data associated with the Space Vehicles selected in step 304/305 and arranging the assistance data associated with the respective selected Space Vehicle to occur in the assistance data sequence in the order selected at step 304/305.

At step 307 the mobile station MS1 is ordered to perform Mobile Station assisted AGPS using the assistance data sequence generated at step 306. In this example scenario, the order to the mobile station MS1 is conveyed from the radio network controller RNC1 to the mobile station MS1 in one or more 3GPP TS 25.331 MEASUREMENT CONTROL message.

At step 308, the radio network controller RNC1 receives measurement results from the first mobile station MS1 in a 3GPP TS 25.331 MEASUREMENT REPORT message.

The position of the first mobile station MS1 is calculated at step 309 utilizing the measurement results received at step 308 and the calculated MS position is returned at step 310 in a 3GPP TS 25.413 LOCATION REPORT message to the core network CN1 as a response to the positioning request received at step 301.

At step 311, the Azimuth/Elevation distribution for the cell in which the first mobile station MS1 is operating is updated based on the measurement results received from the first mobile station MS1 at step 308. Step 311 may of course alternatively be performed before or in parallel with steps 309-310.

The Azimuth/elevation distribution for the cell is initialized and subsequently updated as follows.

Upon initial activation of the positioning function for the cell, the probability of Space Vehicle detection in $bin_{nm}$ is initialized to $$P(bin_{nm}) = 1/NM \quad (2)$$

and a counter variable K representing the number of detected Space Vehicles used for updating the distribution is initialized to zero.

Each time step 311 in FIG. 3A is performed in connection with positioning of a mobile station, such as mobile station MS1, operating in the cell, the following processing according to FIG. 3B is performed.

For each detected Space Vehicle #j reported by the mobile station, the following processing occurs:

At step 321 the counter variable K is incremented by one.

At step 322, the elevation ($\alpha_j$) and azimuth ($\beta_j$) of Space Vehicle #j are calculated. The calculation of the elevation and azimuth angles is performed e.g. from the ephemeris and the GPS TOW available (via the GPS reference receiver 101 in FIG. 1) for each detected Space Vehicle in the radio network controller RNC1.

At step 323, the probability of the $bin_{n_0 m_0}$ which corresponds to the elevation $\alpha_j$ and azimuth $\beta_j$ values determined for the Space Vehicle #j is updated as $$P(bin_{n_0 m_0}) = \frac{K}{K+1}\left(P(bin_{n_0 m_0}) + \frac{1}{K}\right) \quad (3)$$

while the probability of all other bins $bin_{nm}$ are updated as $$P(bin_{nm}) = \frac{K}{K+1} P(bin_{nm}), \; n \neq n_0 \text{ or } m \neq m_0 \quad (4)$$

At step 324 a check is made whether there is at least one additional Space Vehicle (represented by index j+1) to consider. If there is an additional Space Vehicle to consider (an alternative YES at step 324), steps 321 to 324 are repeated for a next Space Vehicle (schematically illustrated by the increment of index variable j at step 325). Otherwise (an alternative NO at step 324) all detected Space Vehicles have been accounted for and the Azimuth/elevation distribution associated with the cell has been updated accordingly.

In the first exemplary embodiments of the invention, the processing steps illustrated in FIG. 3A-3B are performed by digital data processing circuitry in the form of one or more conventional programmable processors CP1 in the radio network controller node RNC1 while data 102 representing the statistical distribution associated with cell C1, as well as statistical distributions associated with other cells controlled by the radio network controller RNC1, are stored in one or more memory units 103.

Apart from the exemplary first embodiments of the invention disclosed above, there are several ways of providing rearrangements, modifications and substitutions of the first embodiments resulting in additional embodiments of the invention.

The first exemplary embodiment of a method for updating control data does not include a way of forgetting old data (e.g. using a Sliding Window), but this could be obtained by a modification of the gain factors of the probability update. It is also possible to update the number of detections in each bin, rather than focusing on the probability distributions directly.

Also, in a cell there will be a variety of GPS propagation conditions, and the selection/sorting is more critical in difficult spots of the cell. To prioritize Space Vehicles (or rather azimuth/elevations) seen in these difficult spots, the results of positioning of mobile stations in these difficult spots could be assigned a higher weight when updating the statistical distribution than results of previous positioning of mobile stations in other parts of the cell. Distinguishing between what is considered to be a positioning performed in difficult spots from a positioning performed in other parts of the cell could be made by considering at least one of:

the number of detected Space Vehicles (detection of few Space Vehicles suggests a difficult spot);

the time required to perform the positioning (it takes longer time to perform a positioning/detecting Space Vehicles in a difficult spot);

the reported measurement uncertainties (large uncertainties in the measurement results reported by mobile stations, suggests a difficult spot).

Thus a weighting could be performed e.g. based on the uncertainty measures in the measurement results reported by mobile stations.

Figure 3C:
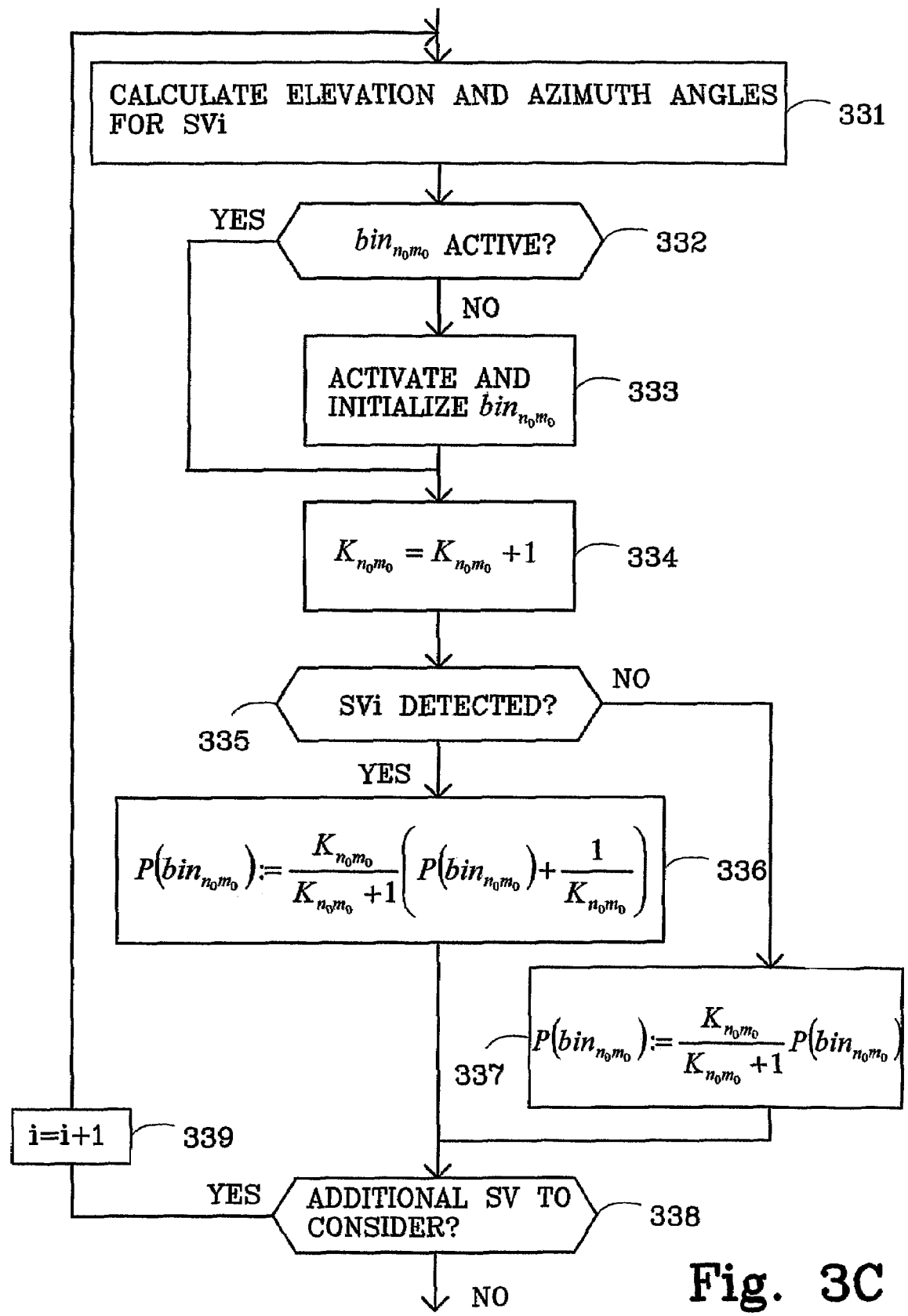
FIG. 3C is a flowchart illustrating an alternative to FIG. 3B

FIG. 3C illustrates an alternative embodiment for updating control data which could be used to perform step 311 of FIG. 3A.

In this embodiment, there is a counter variable $K_{nm}$ associated with each $bin_{nm}$. Upon initial activation of the positioning function for the cell, all bins are marked inactive and all counter variables $K_{nm}$ are initialized to zero.

According to this alternative embodiment, each time step 311 in FIG. 3A is performed in connection with positioning of a mobile station, such as mobile station MS1, operating in the cell, the following processing according to FIG. 3C is performed.

For each Space Vehicle #i for which associated assistance data was provided to the mobile station (at step 307 of FIG. 3A), the following processing occurs:

At step 331, the elevation ($\alpha_i$) and azimuth ($\beta_i$) of Space Vehicle #i are calculated. The calculation of the elevation and azimuth angles is performed e.g. from the ephemeris and the GPS TOW available (via the GPS reference receiver 101 in FIG. 1) in the radio network controller RNC1.

At step 332, a check is made whether $bin_{n_0 m_0}$ which corresponds to the elevation $\alpha_i$ and azimuth $\beta_i$ values determined for the Space Vehicle #i, is active.

If $bin_{n_0 m_0}$ is not active (an alternative NO at step 332), $bin_{n_0 m_0}$ is activated and the associated probability of $bin_{n_0 m_0}$ is initialized at step 333. The bin should preferably be initiated to a prior value that reflects the true detectability of Space Vehicles in the cell, conditioned on the information that a transmitting Space Vehicle is located within the bin in question. Such prior values could be obtained in a number of different ways, e.g. by:

- using geographical information about the cell e.g. building and mountain heights;
- using a GPS planning tool, where the geography of the cell and GPS satellite orbits are used to compute visibility for places in the cell;
- using information, for example mask charts, produced by the GPS reference receiver for the cell.

However, the exact value used for initiating the bins of a cell is not critical, and hence all the bins of a cell could be initiated to a common value of e.g. 0.85-0.9.

At step 334, the counter variable $K_{n_0 m_0}$ associated with $bin_{n_0 m_0}$ is incremented by one.

At step 335, a check is made whether Space Vehicle #i was detected by the mobile station.

If Space Vehicle. #i was detected (an alternative YES at step 335), the probability of $bin_{n_0 m_0}$ is updated at step 336 as $$P(bin_{n_0 m_0}) := \frac{K_{n_0 m_0}}{K_{n_0 m_0}+1}\left(P(bin_{n_0 m_0}) + \frac{1}{K_{n_0 m_0}}\right) \quad (5)$$

If Space Vehicle #i was not detected (an alternative NO at step 335), the probability of $bin_{n_0 m_0}$ is updated at step 337 as $$P(bin_{n_0 m_0}) := \frac{K_{n_0 m_0}}{K_{n_0 m_0}+1} P(bin_{n_0 m_0}) \quad (6)$$

At step 338 a check is made whether there is at least one additional Space Vehicle (represented by index i+1) to consider. If there is an additional Space Vehicle to consider (an alternative YES at step 338), steps 331 to 337 are repeated for a next Space Vehicle (schematically illustrated by the increment of index variable i at step 339). Otherwise (an alternative NO at step 338) all Space Vehicles for which assistance data were provided to the mobile station have been accounted for and the Azimuth/elevation distribution associated with the cell has been updated accordingly.

When applying a statistical distribution updated in accordance with FIG. 3C for selection at step 305 of FIG. 3A, only bins marked as active are considered.

There are several alternatives for how the selection of Space Vehicles and the order of assistance data could be performed at step 305 of FIG. 3A.

For an example, one alternative would be to sort the Space Vehicles according to the probability of successful detection of each Space Vehicle. Then one or more (e.g. two) Space Vehicles having the highest probabilities for successful detection (i.e. the Space Vehicles which are considered easiest to detect) are selected. The remaining Space Vehicles are considered for selection according to the probabilities for successful detection but before actually selecting a Space Vehicle, the effect on the measurement geometry (i.e. the geometric dillution of precision (GDOP)) of selecting said Space Vehicle is also reviewed so as to ensure an appropriate measurement geometry.

Another alternative would be to apply a criterion function for Space Vehicle detection in the selection process as outlined below. Let the Space Vehicles be represented by SV(j), j=1, . . . ,$N_{SV}$, where $N_{SV}$ is the number of Space Vehicles under evaluation. Further, denote the corresponding probabilities of detection of the Space Vehicles by $P_{D,SV(j)}$. Then introduce the following set of selected Space Vehicles, that represents one specific selection of Space Vehicles, for which to provide associated to assistance data to a mobile station $$A = \{SV(j)\}_{j \in \{j_1, \ldots, j_M\}}. \quad (7)$$

A first criterion, accounting for probabilities of detection in a maximum likelihood setting, then becomes $$V_1(A) = \prod_{j \in \{j_1, \ldots, j_k, \ldots, j_M\}} P_{D,SV(j_k)}. \quad (8)$$

The next step is to combine this criterion with information that also accounts for the geometrical effects of the selected SV as given by A. This can be done by accounting for the geometric dillution of precision (GDOP) of the satellite constellation A.

The details of the definition of the GDOP can e.g. be found in [1]. To summarize, the starting point of the derivation of GDOP is the linearized M×4 measurement matrix $$H = \begin{bmatrix} a_{x1} & a_{y1} & a_{z1} & 1 \\ a_{x2} & a_{y2} & a_{z2} & 1 \\ \vdots & \vdots & \vdots & \vdots \\ a_{xM} & a_{yM} & a_{zM} & 1 \end{bmatrix}. \quad (9)$$

Here the directional row vectors ($\alpha_{xi}\ \alpha_{yi}\ \alpha_{zi}$) points from the linearization point (close to the sought position) towards the Space Vehicle in question. [1] then proceeds to prove that $$\begin{bmatrix} \sigma^2_{x_u} & \sigma^2_{x_u y_u} & \sigma^2_{x_u z_u} & \sigma^2_{x_u ct_b} \\ \sigma^2_{x_u y_u} & \sigma^2_{y_u} & \sigma^2_{y_u z_u} & \sigma^2_{y_u ct_b} \\ \sigma^2_{x_u z_u} & \sigma^2_{y_u z_u} & \sigma^2_{z_u} & \sigma^2_{z_u ct_b} \\ \sigma^2_{y_u z_u} & \sigma^2_{y_u ct_b} & \sigma^2_{z_u ct_b} & \sigma^2_{ct_b} \end{bmatrix} = (H^T H)^{-1} \sigma^2_{UERE} \quad (10)$$

where the left hand side is the position covariance matrix and where $\sigma_{UERE}^2$ is the raw pseudorange measurement error, see [1]. The indices x, y and z correspond to the respective coordinates, whereas $ct_b$ denotes the error caused by the receiver clock bias error, see [1]. Hence the matrix $(H^T H)^{-1}$ represent the amplification factors due to the geometry of the SV constellation. From this, the definition of GDOP follows as $$GDOP(A) = \frac{\sqrt{\sigma_{x_u}^2 + \sigma_{y_u}^2 + \sigma_{z_u}^2 + \sigma_{ct_b}^2}}{\sigma_{UERE}}. \quad (11)$$

The smaller the GDOP(A), the better the geometry. Hence, in order to combine the geometrical effects in a joint criterion function that also accounts for the detection probabilities for the selected SVs, the following criterion is suitable $$V_2(A) = \frac{1}{GDOP(A)} \prod_{j \in \{j_1, \ldots, j_k, \ldots, j_M\}} P_{D,SV(j_k)}. \quad (12)$$

A generalization could be to introduce a nonzero, monotonically increasing function $f(.)$ to get $$V_3(A) = \frac{1}{f(GDOP(A))} \prod_{j \in \{j_1, \ldots, j_k, \ldots, j_M\}} P_{D,SV(j_k)}. \quad (13)$$

In order to find the best combination of Space Vehicles, accounting for both detection probabilities and for geometrical effects, the following maximization is performed over all possible combinations $A_i$ of at least 4 Space Vehicles $$A_{Optimal} = \max_{A_i, M_i \geq 4} V_m(A_i), m = 2 \vee 3. \quad (14)$$

Figure 4A:
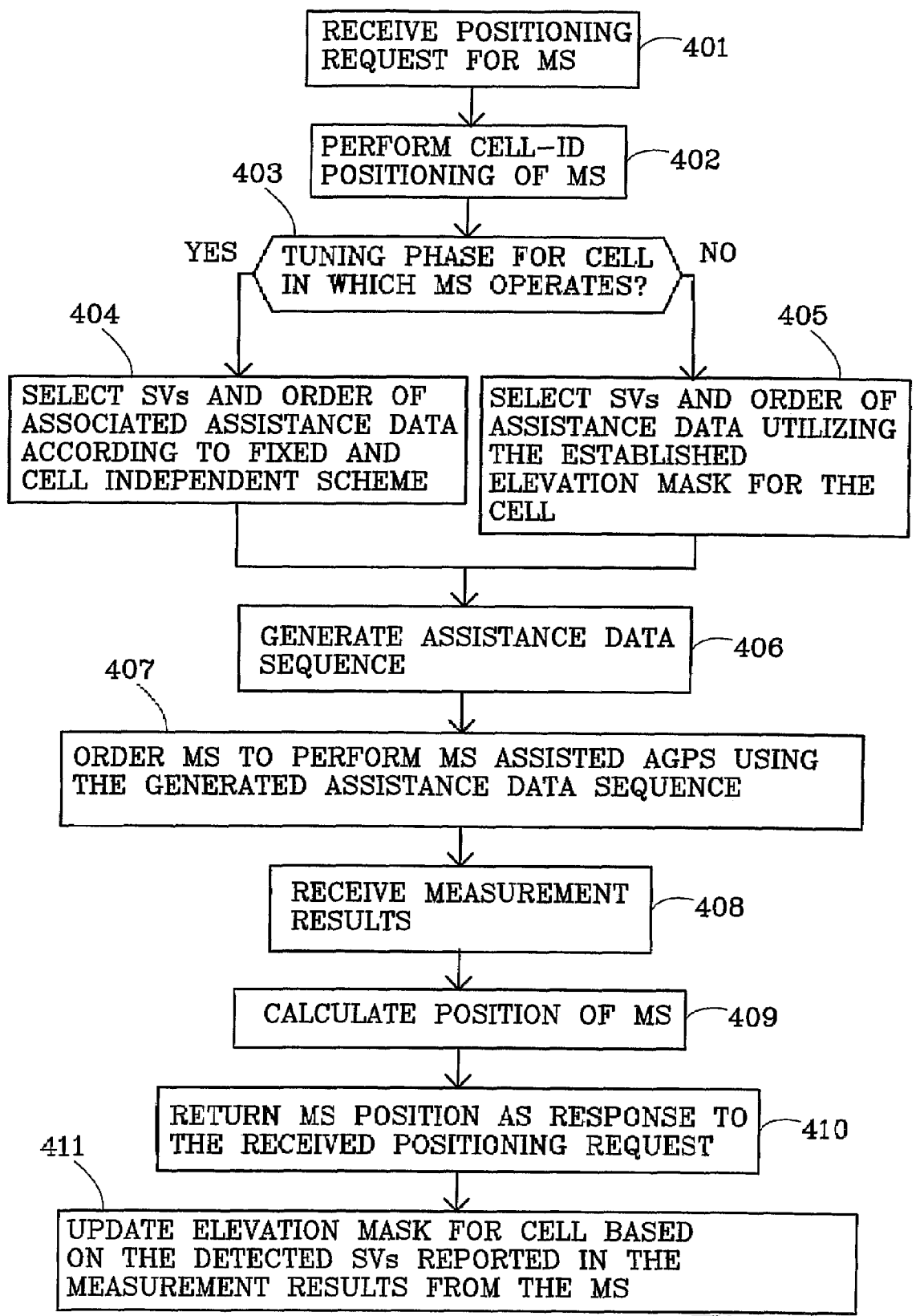
FIG. 4A-B are flowcharts illustrating second exemplary embodiments of methods according to the invention.
Figure 4B:
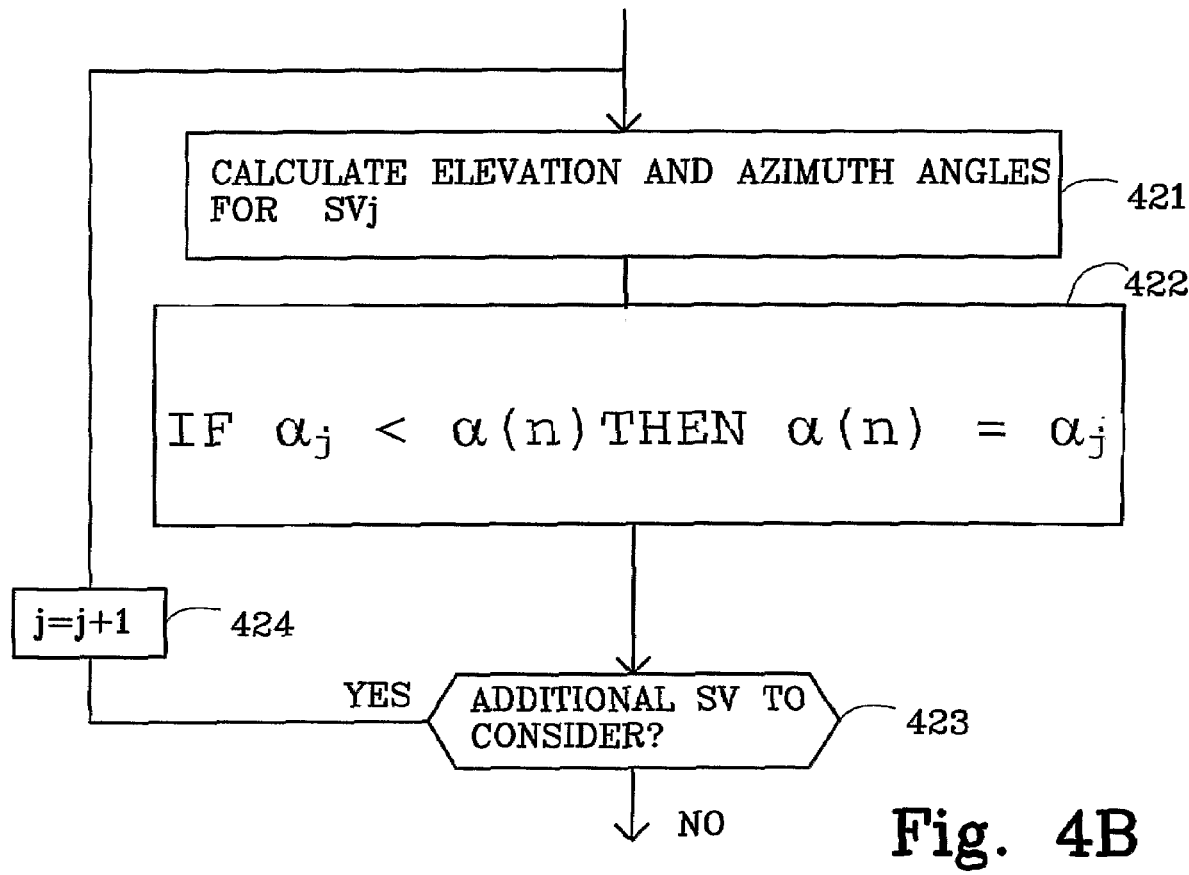

FIG. 4A-4B are flow charts illustrating a second exemplary embodiment of a method according to the invention of providing assistance data and also a second exemplary embodiment of a method according to the invention of updating control data. Both said exemplary methods may be implemented in the radio network controller RNC1 of FIG. 1.

In these exemplary embodiments, for each cell there is control data in the form of an elevation mask associated with the cell. The azimuth angle interval [0, 360] degrees is divided in N bins, $$\text{bin}_n = 360[(n-1)/N, n/N[, n-1, \ldots N, \quad (5)$$

wherein each bin is of width 360/N. The corresponding elevation mask value is denoted $\alpha(n)$.

At step 401 of FIG. 4A, a positioning request for positioning of the mobile station MS1 is received in a 3GPP TS 25.413 LOCATION REPORTING CONTROL message from the core network CN1.

At step 402, CELL-ID positioning is performed to determine in which cell (e.g. cell C1 schematically illustrated in FIG. 1) the mobile station MS1 is operating. A possible soft handover situation could be handled in the same way as previously suggested in connection with step 302 of FIG. 3A.

At step 403, a check is made whether positioning in the cell in which the mobile station MS1 is located is operating in a tuning phase.

If positioning in the cell is operating in a tuning phase (an alternative YES at step 403) a set of Space Vehicles (i.e. satellites) for which associated assistance data should be provided to the mobile station MS1 is selected at step 404. Furthermore, also the order in which said associated assistance data should be provided to the mobile station MS1 is also selected at step 404. Both the selection of Space Vehicles and the order in which the assistance data associated with the selected Space Vehicles are provided to the mobile station MS1 are selected according to a fixed and cell independent scheme. More in particular, in this exemplary embodiment the Space Vehicles are selected randomly among the satellites which according to their GPS Almanac data are believed to be above the horizon (elevation greater than zero degrees) as viewed by the GPS reference receiver 101.

If positioning in the cell is not operating in a tuning phase (an alternative NO at step 403), a set of Space Vehicles for which associated assistance data should be provided to the mobile station MS1 is selected at step 405. Furthermore, also the order in which said associated assistance data should be provided to the mobile station MS1 is selected at step 405. Both the selection of Space Vehicles and the order in which the assistance data associated with the selected Space Vehicles are provided to the mobile station MS1 are selected utilizing the established elevation mask associated with the cell in which the mobile station MS1 is currently operating. More in particular the Space Vehicles are selected as follows. All Space Vehicles which have an elevation value above the elevation mask value corresponding to the azimuth direction of the Space Vehicle are included in the selected set of Space Vehicles for which associated assistance data should be provided to the mobile station MS1. The order in which assistance data associated with individual Space Vehicles is provided to the mobile station may then be selected according to how close the elevation value of the respective Space Vehicle is to 45 degrees. Thus, assistance data associated with the Space Vehicle having an elevation value closest to 45 degrees is provided first to the mobile, station and assistance data associated with the Space Vehicle having an elevation furthest from 45 degrees is provided last to the mobile station.

At step 406 a sequence of assistance data is generated by including the assistance data associated with the Space Vehicles selected in step 404/405 and arranging the assistance data associated with the respective selected Space Vehicle to occur in the assistance data sequence in the order selected at step 404/405.

At step 407 the mobile station MS1 is ordered to perform Mobile Station assisted AGPS using the assistance data sequence generated at step 406. In this example scenario, the order to the mobile station MS1 is conveyed from the radio network controller RNC1 to the mobile station MS1 in a one or more 3GPP TS 25.331 MEASUREMENT CONTROL message.

At step 408, the radio network controller RNC1 receives measurement results from the first mobile station MS1 in a 3GPP TS 25.331 MEASUREMENT REPORT message.

The position of the first mobile station MS1 is calculated at step 409 utilizing the measurement results received at step 408 and the calculated MS position is returned at step 410 in a 3GPP TS 25.413 LOCATION REPORT message to the core network CN1 as a response to the positioning request received at step 401.

At step 411, the elevation mask associated with the cell in which the first mobile station MS1 is operating is updated based on the measurement results received from the first mobile station MS1 at step 408. Step 411 may of course alternatively be performed before or in parallel with steps 409-410.

The elevation mask associated with the cell is initialized and subsequently updated as follows.

Upon initial activation of the positioning function for the cell, a common initial elevation mask value $\alpha_0$ is set for each bin in the cell e.g. according to a configuration parameter accounting for type of terrain, typically e.g. 15-45 degrees.

The initial elevation mask value should be selected high enough to allow the elevation mask values to be reduced according to the scheme of FIG. 4B when detecting satellites.

Each time step 411 in FIG. 4A is performed in connection with positioning of a mobile station, such as mobile station MS1, operating in the cell, the following processing according to FIG. 4B is performed.

For each detected Space Vehicle #j, reported by the mobile station, the following processing occurs:

At step 421, the elevation ($\alpha_j$) and azimuth ($\beta_j$) of Space Vehicle #j are calculated. The calculation of the elevation and azimuth angles is performed e.g. from the ephemeris and the GPS TOW available for each detected Space Vehicle in the radio network controller RNC1.

At step 422, the elevation mask value $\alpha(n)$ of the $bin_n$ corresponding to the azimuth value $\beta_j$ determined for the Space Vehicle #j (i.e. $\beta_j \in bin_n$) is compared to the elevation value $\alpha_j$ and if $\alpha_j$ is less than $=(n)$, then $\alpha(n)$ is updated to be equal to $\alpha_j$.

At step 423 a check is made whether there is at least one additional Space Vehicle (represented by index j+1) to consider. If there is an additional Space Vehicle to consider (an alternative YES at step 423), steps 421 to 423 are repeated for a next Space Vehicle (schematically illustrated by the increment of index variable j at step 424). Otherwise (an alternative NO at step 423) all detected Space Vehicles have been accounted for and the elevation masks have been updated accordingly.

Different variations of the method illustrated in FIG. 4A-B are possible. The elevation mask associated with a cell may e.g. be over-optimistic for the majority of users since minimum values of elevation angles of detected Space Vehicles are used to trigger update of the elevation mask, using detections from all users and locations within a cell. It may turn out that Space Vehicles with too low angles are sometimes detected anyway, e.g. due to multipath propagation. A remedy for this would be to modify the mask update procedure e.g. with a sliding 95% percentile of the (lower end) elevation angle. In order to do so, a FIFO-buffer that stores e.g. the 50 last Space Vehicle elevations for each azimuth bin could be used, and the 95% percentile computed accordingly.

Another modification would be to arrange an elevation mask having softer elevation limits. This could be accomplished e.g. by having two elevation values associated with each bin, where one elevation value represents the minimum elevation for any Space Vehicle detected for the bin and a second elevation value above which 50% of all successful detection of Space Vehicles for the bin have occurred.

Another modification would be to make the division into bins adaptive. In case many measurements end up in a specific azimuth bin, then that bin can e.g. be divided into two bins to enhance the resolution. Bins that receive too few measurements may instead be merged. Such an adaptive division into bins may of course also be applied in the embodiments illustrated in FIG. 3A-3C.

Still another alternative would be to arrange control data associated with a cell to include both a statistical distribution as illustrated in connection with FIGS. 3A-3C as well as an elevation mask as illustrated in connection with FIGS. 4A-4B. For this alternative, updating of the statistical distribution could still be performed in accordance with the FIG. 3B or 3C while updating of the elevation mask could be performed in accordance with FIG. 4B. The elevation mask could then be used to select Space Vehicles for which to provide associated assistance data while the order in which assistance data is provided to a mobile stations could be determined from the statistical distribution.

There are alternative ways of selecting Space Vehicles and the order of associated assistance data at step 304 of FIG. 3A and at step 404 of FIG. 4A when positioning in a cell is operating in a tuning phase. As an example, instead of selecting Space Vehicles purely by random among those Space Vehicles believed to be above the horizon, an attempt could be to try and cover the different bins more evenly by selecting a different Space Vehicle if a Space Vehicle about to be selected according to the random process is associated with a bin already sufficiently covered.

Also, in alternative embodiments the tuning phase for a cell could be reentered e.g. if the percentage of failed positionings of mobile stations in the cell is above a certain threshold for a defined period of time, periodically or triggered by Operation & Maintenance personnel. Yet another alternative would be to perform selection of Space Vehicles and the order of associated assistance data in the same way as during the tuning phase for a small fraction (e.g. 5%) of the positionings of mobile stations in a cell also after the "tuning phase", which would guarantee a continuous slow update of the statistics.

Figure 5:
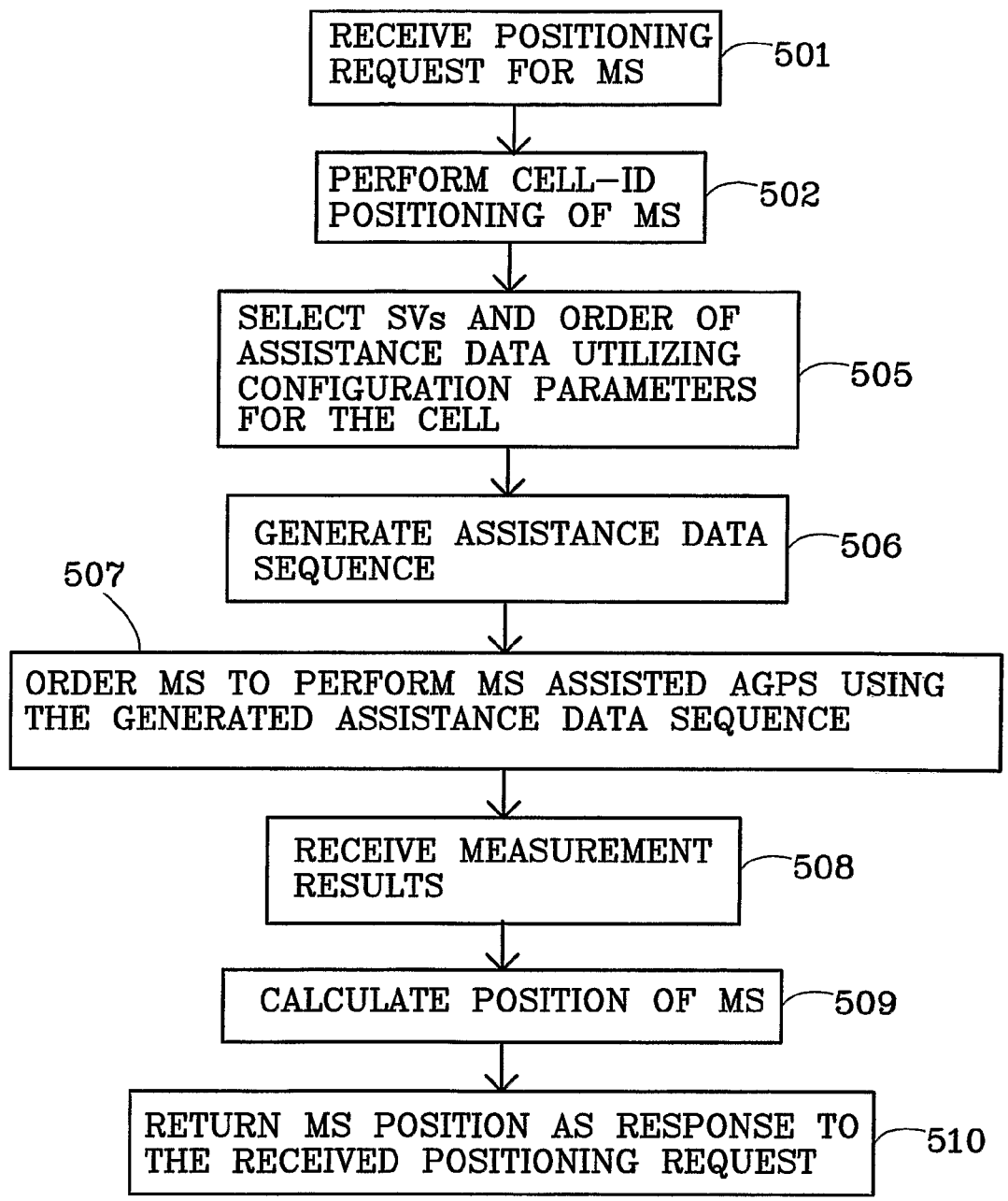
FIG. 5 is a flow chart illustrating yet another exemplary embodiment of a method according to the invention

Yet another exemplary embodiment of a method of providing assistance data according to the invention is illustrated in FIG. 5. In this exemplary embodiment, each cell is associated with one or more configuration parameters (set via an Operation and Maintenance system) which are used for controlling the selection of Space Vehicles for which to provide associated assistance data and the order in which assistance data associated with individual Space Vehicles occurs in the generated sequence of assistance data.

The configuration parameters associated with a cell may include one or more of e.g.:

minimum satellite elevation threshold parameter;
  maximum satellite elevation threshold parameter;
  one or more preferred satellite azimuth directions e.g. to account for directions of streets in an area with "urban canyons";
  parameter indicating whether low elevation or high elevation Space Vehicles are preferred. Such parameters may be used to enable a preferred selection of high elevation Space Vehicles in an area e.g. with urban canyons or mountains and indicating a preferred selection of low elevation Space Vehicles for e.g. indoor cells or a suburban and/or rural area dominated by residential homes so as to benefit from GPS radiation through windows.

The processing performed in steps 501-502 and 506-510 of FIG. 5 correspond to the processing performed in corresponding steps 301-302 and 306-310 of FIG. 3A and will not be elaborated upon any further. Furthermore, in this embodiment there is no updating step corresponding to step 311 of FIG. 3A.

Once the cell in which the mobile station MS1 is operating has been established at step 502, a set of Space Vehicles for which associated assistance data should be provided and also the order in which said associated assistance data should be provided to the mobile station MS1 are selected at step 505. Both the selection of Space Vehicles and the order in which the assistance data associated with the selected Space Vehicles are provided to the mobile station MS1 are selected utilizing the configuration parameters associated with the cell. Thus in a scenario where the configuration parameters associated with the cell would indicate that low elevation Space Vehicles are preferred, low elevation Space Vehicles (possible restricted by a minimum elevation threshold parameter) would be selected before higher elevation Space Vehicles and also the order in which assistance data associated with individual Space Vehicles would reflect the order in which Space Vehicles were selected. In a scenario where the configuration parameters associated with a cell instead would indicate that high elevation Space Vehicles are preferred, the order of selecting Space Vehicles would be the opposite.

It is of course possible to combine the different embodiments of FIGS. 3A-3B, FIG. 4A-4B and FIG. 5 so that different embodiments are utilized for different cells served by the radio network controller RNC1 in FIG. 1.

Figure 7:
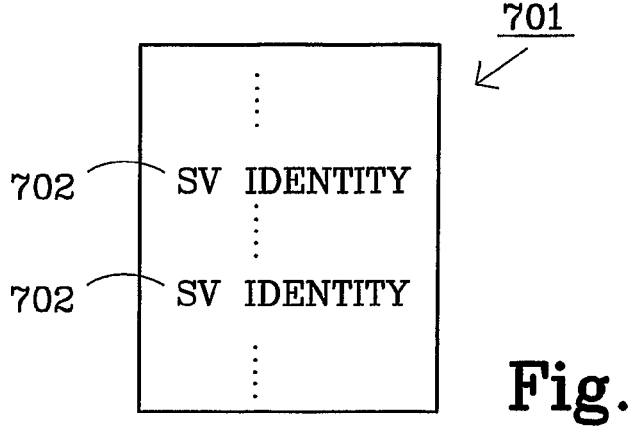
FIG. 7 is a block diagram illustrating an extended measurement report message according to the invention for use in connection with Mobile Station based AGPS.

The invention is applicable both in the context of Mobile Station assisted as well as Mobile Station based AGPS. The exemplary embodiment using configuration parameters illustrated in FIG. 5 is directly applicable also to Mobile Station based AGPS (with the exception of step 509 which of course would have been performed by the mobile station itself prior to sending measurement results to the network). In order to adapt the exemplary embodiments illustrated in FIG. 3A-3C and FIG. 4A-4B for use in the context of Mobile Station based AGPS, the MEASUREMENT REPORT message sent from mobile stations could be extended. FIG. 7. illustrates such an extended MEASUREMENT REPORT message 701 where the message has been extended to include Space Vehicle identity 702 of Space Vehicles detected by a mobile station when performing Mobile Station based AGPS. In addition, the position calculation steps 309 and 409 would of course be performed by the mobile station instead of by the network.

It is also possible to apply a mix of Mobile Station assisted and Mobile Station based AGPS in a cell, utilizing measurement results from only Mobile Station assisted AGPS positionings for control data updating while utilizing said control data for selecting Space Vehicles and/or the order in which assistance data associated with the selected Space Vehicles are provided to mobile station in connection with both Mobile Station assisted and Mobile Station based AGPS.

Further embodiments of the invention for use in the context of Mobile Station based AGPS may also be provided that do not require extension of MEASUREMENT REPORT messages in order to exploit the results of Mobile Station based AGPS positionings in a cell for the purpose of control data updating. Such embodiments may be provided by exploiting the uncertainty ellipse/ellipsoid included in MEASUREMENT REPORT messages when using Mobile Station based AGPS. The reported uncertainty ellipsoid expresses the directions where the conditions are most favourable (direction of minor axis, with respect to north) and least favourable (direction of major axis, with respect to north), for obtaining an accurate position. Thus control data in the form of a statistical distribution may be defined for the cell by assigning a weight (probability) of Space Vehicle detection, for each azimuth, that is a function that attains higher values in those directions that are close to the direction of the minor axis and smaller values in directions that are close to the major axis. Such a statistical distribution would preferably be organized into a number of azimuth bins similar to what was disclosed in connection with FIGS. 4A-4B.

Figure 6:
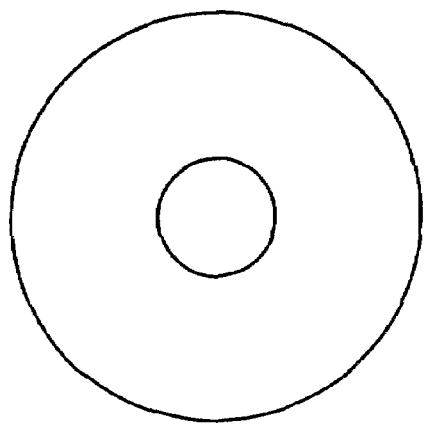
FIG. 6 shows an example of a computer-readable medium

The different embodiments of methods according to the invention disclosed above may all be implemented the same way as for the first exemplary embodiment, i.e. utilizing digital data processing circuitry in the form of one or more conventional programmable processors to perform the different processing steps of the methods. However, any digital data processing circuitry capable of performing said processing could be used, e.g. a state machine, an ASIC, a discrete logic circuit etc. In the first exemplary embodiment: of the invention, as in other embodiments of the invention using programmable devices, the controlling computer program (software) is embodied as machine-readable instructions stored on some kind of computer-readable medium such as RAM, a hard drive, electronic read-only memory, an optical storage device (e.g. a CD-ROM as schematically illustrated in FIG. 6) etc. Programmable devices performing processing according to the invention, can be dedicated to this task or used also for processing relating to other tasks.

The invention is further applicable both in the context of control plane and user plane solutions to AGPS (as long as the user plane solution allows the cell in which a mobile station is operating to be determined).

The invention can of course be used in connection with any type of cellular communication system (e.g. GSM, UMTS, CDMA2000, IS-95, PDC, DAMPS etc).

Even though the invention in its first exemplary embodiment has been applied in the context of assisted GPS, the invention may of course be applied in connection with other satellite based positioning systems where assistance data associated with individual satellites are provided for positioning of mobile stations operating in cells of a cellular system.

REFERENCES

[1] E. D. Kaplan, Understanding GPS—Principles and Applications. Norwood, Mass.: Artech House, 1996.
[2] A. Kangas and T. Wigren, "Location coverage and sensitivity with A-GPS", URSI EMP-S, Pisa, Italy, May, 2004.

The invention claimed is:

1. A method of updating control data related to satellite based positioning of mobile stations operating in a cellular radio communication system utilizing ranging signals transmitted by plural satellites, said method characterized in
automatically updating control data associated with a first cell of the cellular radio communication system and reflecting local obstructions in the first cell or its immediate surroundings affecting reception in the first cell of said ranging signals wherein said updating is performed utilizing information derived from positionings of mobile stations in the first cell, wherein said control data includes at least one of:
a statistical distribution as a function of azimuth and/or elevation representing detected satellites from positionings of mobile stations in the first cell; and
an elevation mask as a function of azimuth representing minimum elevations of detected satellites from positionings of mobile stations in the first cell.

2. The method according to claim 1 wherein in said statistical distribution, the results of positionings of mobile stations in difficult spots are assigned a higher weight than results of positionings of mobile stations in other parts of the first cell.

3. The method according to claim 2, wherein distinguishing between positionings in difficult spots and positionings in other parts of the cell is made by considering at least one of:
the number of satellites detected;
the time required to perform the positioning;
the reported measurement uncertainties.

4. The method according to claim 1, wherein said statistical distribution is organized into a finite number of bins, where each bin corresponds to a range of azimuth and/or elevation values, and wherein the division into bins may be adjusted based on the number of satellite detections associated with different bins.

5. The method according to claim 1 wherein said elevation mask is organized into a finite number of bins, where each bin corresponds to a range of azimuth values and is associated with a minimum elevation of satellites detected within said range of azimuth values.

6. The method according to claim 5, wherein the division into bins for the elevation mask may be adjusted based on the number of satellite detections associated with different bins.

7. The method according to claim 1, wherein the information derived from positioning of a mobile station in the first cell includes the position of satellites detected by said mobile station.

8. The method according to claim 7, wherein the position of satellites detected by said mobile station is derived from satellite identity information reported by the mobile station and knowledge of the respective satellites movements.

9. The computer program embodied on a computer-readable medium and executable by digital data processing circuitry to perform a method according to claim 1.

10. A method of providing assistance data for satellite based positioning of mobile stations operating in a first cell of a cellular radio communication system utilizing ranging signals transmitted by plural satellites, said method including:
generating a sequence of assistance data for positioning of a mobile station operating in the first cell by including in said sequence assistance data associated with individual satellites in a set of at least four satellites,
characterized in that at least one of said set of at least four satellites and the order in which assistance data associated with individual satellites occurs in said sequence of assistance data is selected utilizing control data associated with the first cell and reflecting local obstructions in the first cell or its immediate surroundings affecting reception of said ranging signals in the first cell.

11. The method according to claim 9, wherein said control data includes one or more configuration parameters indicating at least one of:
minimum satellite elevation threshold parameter;
maximum satellite elevation threshold parameter;
one or more preferred satellite azimuth directions.

12. The method according to claim 10, wherein at least one satellite, which based on said control data is considered as among the satellites having the highest probability for detection, is included in said set of at least four satellites.

13. The method according to claim 10, wherein assistance data associated with a satellite, which based on said control data is considered as among the satellites having the highest probability for detection, is arranged first in said sequence of assistance data.

14. The method according to anyone of claim 10, wherein when selecting Space Vehicles for inclusion in said set of selected Space Vehicles, both the probability for successful detection and the effect on the measurement geometry are considered.

15. An apparatus for updating control data related to satellite based positioning of mobile stations operating in a cellular radio communication system utilizing ranging signals transmitted by plural satellites, said apparatus characterized in
digital data processing circuitry adapted to automatically update control data associated with a first cell of the cellular radio communication system and reflecting local obstructions in the first cell or its immediate surroundings affecting reception in the first cell of said ranging signals, wherein said control data is updated by utilizing information derived from positionings of mobile stations in the first cell and said control data includes at least one of:
a statistical distribution as a function of azimuth and/or elevation of detected satellites from positionings of mobile stations in the first cell; and
an elevation mask as a function of azimuth representing minimum elevations of detected satellites from positionings of mobile stations in the first cell.

16. The apparatus according to claim 15, wherein in said statistical distribution, the results of positionings of mobile stations in difficult spots are assigned a higher weight than results of positionings of mobile stations in other parts of the first cell.

17. The apparatus according to claim 15, wherein said statistical distribution is organized into a finite number of bins, where each bin corresponds to a range of azimuth and/or elevation values, and wherein said digital data processing circuitry is capable of adjusting the division into bins based on the number of satellite detections associated with different bins.

18. The apparatus according to claim 15, wherein said elevation mask is organized into a finite number of bins, where each bin of the elevation mask corresponds to a range of azimuth values and is associated with a minimum elevation of satellites detected within said range of azimuth values.

19. The apparatus according to claim 18, wherein said digital data processing circuitry is capable of adjusting the division into bins of the elevation mask based on the number of satellite detections associated with different bins.

20. An apparatus for providing assistance data for positioning of mobile stations operating in a first cell of a cellular radio communication system utilizing ranging signals transmitted by plural satellites, said apparatus including:
digital data processing circuitry adapted to generate a sequence of assistance data for positioning of a mobile station operating in the first cell by including in said sequence assistance data associated with individual satellites in a set of at least four satellites,
characterized in that at least one of said set of at least four satellites and the order in which assistance data associated with individual satellites occurs in said sequence of assistance data is selected utilizing control data associated with the first cell and reflecting local obstructions in the first cell or its immediate surroundings affecting reception of said transmitted ranging signals in the first cell.

21. The apparatus according to claim 20, wherein said control data includes one or more configuration parameters indicating at least one of:
minimum satellite elevation threshold parameter;
maximum satellite elevation threshold parameter;
one or more preferred satellite azimuth directions.

22. The apparatus according to claim 20, wherein at least one satellite, which based on said control data is considered as among the satellites having the highest probability for detection, is included in said set of at least four satellites.

23. The apparatus according to claim 20, wherein assistance data associated with a satellite, which based on said control data is considered as among the satellites having the highest probability for detection, is arranged first in said sequence of assistance data.

* * * * *

UNITED STATES PATENT AND TRADEMARK OFFICE
CERTIFICATE OF CORRECTION

PATENT NO. : 7,692,582 B2
APPLICATION NO. : 11/912991
DATED : April 6, 2010
INVENTOR(S) : Wigren et al.

Page 1 of 1

It is certified that error appears in the above-identified patent and that said Letters Patent is hereby corrected as shown below:

Title Page;
On the Face Page, in Field (75), under "Inventors", in Column 1, Line 1, delete "Torbjorn" and insert -- Torbjörn --, therefor.

On the Face Page, in Field (75), under "Inventors", in Column 1, Line 2, delete "Mans" and insert -- Måns --, therefor.

On the Face Page, in Field (75), under "Inventors", in Column 1, Line 2, delete "Skogas" and insert -- Skogås --, therefor.

In Column 3, Line 23, delete "GPRS:" and insert -- GPRS --, therefor.

In Column 5, Line 28, delete "sequence," and insert -- sequence --, therefor.

In Column 6, Line 5, in Equation (1), delete " $bin_{n,m=\{\beta,\alpha|\beta} \in 360[(n-1)/N, n/N[, \alpha \in 90[(m-1)/M, m/M[\}$ " and insert -- $bin_{n,m=\{\beta,\alpha|\beta} \in 360[(n-1)/N, n/N], \alpha \in 90[(m-1)/M, m/M]\}$ --, therefor.

In Column 11, Line 45, in Equation (5), delete " $bin_n = 360[(n-1)/N, n/N[, n-1, \ldots N,$ (5) " and insert -- $bin_n = 360[(n-1)/N, n/N], n-1, \ldots N,$ (15) --, therefor.

In Column 17, Line 45, in Claim 14, after "according to" delete "anyone of".

Signed and Sealed this
First Day of March, 2011

David J. Kappos
*Director of the United States Patent and Trademark Office*